United States Patent [19]
Mount, III et al.

[11] Patent Number: 5,981,079
[45] Date of Patent: Nov. 9, 1999

[54] ENHANCED BARRIER VACUUM METALLIZED FILMS

[75] Inventors: Eldridge M. Mount, III, Fairport; John R. Wagner, Jr., Rochester, both of N.Y.

[73] Assignee: Mobil Oil Corporation, Fairfax, Va.

[21] Appl. No.: 08/792,669

[22] Filed: Jan. 29, 1997

[51] Int. Cl.$^6$ .......................... B32B 15/08; B32B 27/08; B32B 27/16; B32B 27/32
[52] U.S. Cl. .................. 428/461; 428/35.8; 428/515; 428/516; 428/910; 427/532; 427/533; 427/535; 427/536; 427/537; 427/569; 427/404
[58] Field of Search ................... 428/515, 516, 428/35.8, 36.6, 461, 910; 427/532, 533, 535, 536, 537, 539, 569, 299, 404

[56] References Cited

U.S. PATENT DOCUMENTS

| | | | |
|---|---|---|---|
| 4,016,305 | 4/1977 | Wakabayashi et al. | 427/42 |
| 4,180,614 | 12/1979 | Angelo et al. | 428/336 |
| 4,345,004 | 8/1982 | Miyata et al. | 428/416 |
| 4,345,005 | 8/1982 | All et al. | 428/461 |
| 4,357,383 | 11/1982 | Howden | 428/213 |
| 4,714,658 | 12/1987 | Kadash et al. | 428/523 |
| 4,756,964 | 7/1988 | Kincaid et al. | |
| 4,772,348 | 9/1988 | Hirokawa et al. | 156/272.6 |
| 4,855,187 | 8/1989 | Osgood, Jr. et al. | 428/516 |
| 4,888,237 | 12/1989 | Balloni et al. | 428/347 |
| 4,897,305 | 1/1990 | Ho | 428/333 |
| 4,940,521 | 7/1990 | Dinter et al. | 204/164 |
| 5,175,054 | 12/1992 | Chu | 428/461 |
| 5,194,318 | 3/1993 | Migliorini et al. | 428/215 |
| 5,223,346 | 6/1993 | Lu | 428/516 |
| 5,280,084 | 1/1994 | Paul | 525/375 |
| 5,357,005 | 10/1994 | Buchwalter et al. | 525/436 |
| 5,389,195 | 2/1995 | Ouderkirk et al. | 156/643 |
| 5,405,880 | 4/1995 | Kimura et al | 523/126 |
| 5,407,713 | 4/1995 | Wilfong et al. | 428/34.1 |
| 5,487,940 | 1/1996 | Bianchini et al. | 428/349 |
| 5,508,075 | 4/1996 | Roulin et al. | 428/35.7 |
| 5,512,338 | 4/1996 | Bianchini | 428/35.4 |
| 5,525,421 | 6/1996 | Knoerzer | 428/347 |
| 5,527,608 | 6/1996 | Kemp-Patchett et al. | 428/349 |

FOREIGN PATENT DOCUMENTS 6-279996  10/1994  Japan .

*Primary Examiner*—Vivian Chen
*Attorney, Agent, or Firm*—Dennis P. Santini

[57] ABSTRACT

A multi layer film having enhanced barrier properties against transmission of oxygen and water vapor is provided. The multi layer film includes a polypropylene base layer, with a high density polyethylene layer on at least one surface of the polypropylene base layer. The polyethylene layer includes a surface which has been subjected to plasma treatment with a hydroxyl-donating material such as a methanol. The film further includes a metal layer deposited on the plasma treated surface, such as a layer of vacuum deposited aluminum. Multi layer films according to the present invention are particularly useful as packaging films for food products.

9 Claims, No Drawings

5,981,079

ENHANCED BARRIER VACUUM METALLIZED FILMS

FIELD OF THE INVENTION

The present invention relates to vacuum metallized packaging films having enhanced barrier characteristics and incorporating a plasma treated polyethylene layer.

BACKGROUND OF THE INVENTION

Plastic materials such as polymeric films have been widely used for packaging various food and non-food products. In order to ensure proper preservation of products packaged in such polymeric films, it is necessary to provide the films with barriers against transmission of air, moisture, deleterious flavors, etc. Unmodified polymeric films, however, typically lack sufficient gas and moisture barrier characteristics needed for proper packaging requirements. For example, polypropylene films are particularly preferred in the manufacture of packaging films due to their low cost and ease of manufacture. Such films, however, inherently permit the transmission of oxygen and water vapor from the outside of the film to the inside of the package made up of the film. As will be recognized by those skilled in the art, transmission of oxygen and water vapor through food packagings promote deterioration of the foods packaged therein.

Multi layer polymeric films have been developed having improved gas and moisture barrier characteristics. For example, it is known that films incorporating ethylene vinyl alcohol as a co-extruded coated layer thereon display improved oxygen and moisture barrier properties. U.S. Pat. No. 5,192,620 discloses an oriented polypropylene base layer having a coating on one surface of a blend of a vinyl alcohol homopolymer or copolymer and an ethylene-acrylic acid copolymer, with a further metal layer thereon. Films incorporating ethylene vinyl alcohol as co-extruded or coated layers, however, are difficult and expensive to manufacture.

The use of multi layer films incorporating metal layers has also been proposed for providing improved barrier properties. U.S. Pat. No. 5,194,318, the disclosure of which is incorporated herein by reference, discloses a metallized oriented thermoplastic film combination having a propylene homopolymer or copolymer substrate with a high density polyethylene skin layer on at least one side of the substrate. The high density polyethylene skin layer further includes a thin metal layer which has been vapor deposited thereon. In one embodiment, the high density polyethylene skin layer is flame or corona discharge treated, and the metal coating is thereafter deposited onto the flame or corona discharge treated layer. Although films which incorporate a high density polyethylene skin do not suffer from the deleterious effects of metal pick off, such films do not provide optimum oxygen and water vapor barrier properties for all packaging needs.

Plasma treatment of polymeric films with hydrocarbons has been proposed to impart improved adhesion of metal coatings to films. For example, U.S. Pat. No. 4,897,305 discloses a packaging film of a polyolefin substrate such as polypropylene having a thin layer of a low molecular weight hydrocarbon and a metal layer thereon. The film is prepared by exposing the polypropylene substrate to a plasma treatment of aliphatic hydrocarbon vapors, followed by vapor deposition of a metal layer. The films produced with plasma treatment involving aliphatic hydrocarbons, however, are expensive to manufacture, and the hydrocarbon layer is not believed to add any significant barrier properties to the film.

While the prior art discloses various packaging films, such films are typically difficult to manufacture, involve incorporation of costly materials and processes, and provide inefficient adhesion for a subsequent vapor deposited metal layer. Accordingly, a need exists for a packaging film which is simple and inexpensive to manufacture and which is capable of providing enhanced barrier properties to oxygen and water vapor transmission.

SUMMARY OF THE INVENTION

It is an object of the present invention to provide a packaging film having improved oxygen and water vapor barrier properties.

It is a further object of the present invention to provide a packaging film with improved barrier properties which is simple and inexpensive to manufacture.

These and other objects are achieved in the present invention which provides a multi layer film having a polypropylene base layer with a high density polyethylene layer on at least one surface thereof, with the polyethylene layer having a surface which has been subjected to plasma treatment with a hydroxyl-donating material, such as methanol. The film also includes a metal layer deposited on the plasma-treated surface of the polyethylene layer, for example, vapor deposited aluminum. As a result, a multi layer film is provided which exhibits excellent oxygen and moisture barrier properties.

DETAILED DESCRIPTION OF THE PREFERRED EMBODIMENT

The present invention is directed to multi layer films incorporating a polypropylene base layer having a high density polyethylene layer adhered to at least one surface thereof. An exposed surface of the high density polyethylene layer on the polypropylene base layer is subjected to a plasma treatment in the presence of a hydroxyl-donating material. A metal layer is then deposited on the thus treated polyethylene layer. Films produced according to the present invention exhibit excellent barrier properties against the transmission of oxygen and water vapor.

The polypropylene base layer contemplated by the present invention can be any suitable polypropylene polymer useful in the manufacture of thermoplastic films, such as propylene homopolymers and copolymers. Propylene homopolymers of particular use include 80–100% isotactic polypropylene, most preferably 95–96% isotactic polypropylene. Preferably, the propylene homopolymers have a melt index ranging from about 2 to about 10 grams/10 minutes and most preferably a melt index of from about 3.5 to about 6 grams/10 minutes. Particularly preferred propylene copolymers include 98-93/2-7 propylene/ethylene copolymers, 50/50 propylene/butene-1 copolymer, 95/5 propylene/1-pentene copolymer, 90/10 propylene/1-hexene copolymer, 80/20 propylene/4-methyl-1-pentene copolymer, etc.

The polypropylene base layer includes a polyethylene layer or skin on at least one surface thereof. The polyethylene layer can be in the form of a bulk layer coated on the polypropylene layer or co-extruded with the polypropylene layer. Polyethylenes contemplated for use as polyethylene layers or skins in the present invention include medium and high density polyethylenes, with high density polyethylenes being most suitable. It is believed that the high crystallinity and smoothness associated with high density polyethylenes results in improved adherence of the deposited metal layer. Particularly preferred are polyethylenes having a density of about 0.960 or greater.

The high density polyethylene can be composed exclusively of a single high-density polyethylene resin, a mixture of high density polyethylene resins, or of a high density polyethylene containing a minor portion of about 10 weight % microcrystalline wax.

The polypropylene base layer having the polyethylene layer thereon can be referred to as an intermediate film structure, for purposes of the present invention. Such an intermediate film structure can include the polyethylene layer or skin adhered to one or both sides or surfaces of the polypropylene base layer. Of particular usefulness in the present invention are intermediate film structures including combinations of polypropylene and high density polyethylene, such as those disclosed in U.S. Pat. No. 5,194,318. Preferably, the intermediate film structure is comprised of co-extruded polypropylene and high density polyethylene, with the intermediate film structure being subjected to biaxial orientation, as will be described in more detail herein.

The intermediate film structure incorporating the polypropylene base layer and the polyethylene layer is subjected to plasma treatment in the presence of a hydroxyl-donating material. For purposes of the present invention, a hydroxyl-donating material refers to a material which, when subjected to a plasma environment, is capable of imparting hydroxyl (—OH) functionality on a surface of a film. Of particular usefulness are lower chain alcohols having less than five carbons. Such materials, as will be described in more detail herein, are capable of dissociating into hydroxy free radicals in a plasma environment, and reassociating on the surface of a film.

As noted above, the intermediate film structure can incorporate polyethylene layers on one or both surfaces of the polypropylene base layer. In the present invention, the plasma treatment is to be conducted on the exposed surface of the polyethylene layer on which the metal layer is to be deposited. As such, in instances where the intermediate film structure includes polyethylene layers on both surfaces of the polypropylene base layer, one or both polyethylene layers can be subjected to plasma treatment in the presence of a hydroxyl-donating material, depending on whether the metal layer is to be deposited onto one or both of the polyethylene layers, respectively.

The plasma treatment can be accomplished in any known manner, as will be discussed in more detail herein. While the exact chemistry of the plasma treatment involving the hydroxyl-donating material is not completely understood, it is believed that creating a plasma in the presence of a hydroxyl-donating material causes the a hydroxyl-donating material to dissociate and recombine. By exposing the polyethylene surface layer of the intermediate film structure to the hydroxyl-donating material-plasma, the hydroxyl-donating material is believed to dissociate into —OH free radicals, which recombine on the polyethylene surface of the intermediate film structure. The surface of the polyethylene layer is thus transformed into an alcohol rich surface containing —OH groups. Such an alcohol rich surface is believed to mimic the surface of an ethylene vinyl alcohol bulk layer for barrier characteristics and subsequent metallization purposes, without the added difficulty or expense involved in co-extruding or coating such a bulk layer onto the intermediate film structure.

Hydroxyl-donating materials which are particularly useful in the present invention include lower chain alcohols having less than five carbons. Particularly preferred examples include methanol, ethanol, propanol and butanol, with methanol being most preferred.

It is believed that plasma treatment with a hydroxyl-donating material imparts an —OH functionality to the high density polyethylene surface, which in effect mimics the barrier properties of an ethylene vinyl alcohol bulk layer, without the added processing and costs involved with applying or co-extruding a separate ethylene vinyl alcohol layer. While the exact surface chemistry resulting from the plasma treatment incorporating a hydroxyl-donating material is not entirely understood, it is believed that the oxygen content of the hydroxyl-donating material plays an important role in imparting a high surface energy to the surface of the polyethylene layer. As noted above, the surface of the polyethylene layer of the intermediate film structure which has been subjected to plasma treatment with the hydroxyl-donating material includes —OH groups. Such —OH groups impart high surface energy to the intermediate film structure, which improves the adhesion of a subsequently deposited metal layer. While ethylene vinyl alcohol bulk layers which have been co-extruded or coated onto intermediate film structures have been known to improve barrier qualities of the intermediate film structure, it is believed by the present inventors that the interface between a high surface energy polymer and a subsequently deposited metal layer is capable of producing a high barrier to gases and moisture. Thus, the interface between the high energy surface of the polyethylene layer of the intermediate film structure established by the —OH groups concentrated thereon and a subsequently deposited metal layer provides enhanced barrier properties to films.

Additionally, the —OH groups impart a degree of polarity to the polyethylene surface of the intermediate film structure. Such polarity is believed to strengthen the adhesion of the subsequently deposited metal layer. Typically, polyolefin films are non-polar in nature. In order to provide good metal adhesion for deposited metal layer, it is believed that at least a small degree of polarity is necessary. U.S. Pat. No. 4,897,305 attempts to provide improved adhesion to a polyolefin film using plasma treatment with an aliphatic hydrocarbon. It is noted in that patent that such treatment accomplishes improved metal-to-polyolefin adhesion without altering the non-polar nature of the film. To the contrary, in the present invention the surface characteristics of the high density polyethylene layer of the intermediate film structure can be altered to provide a small degree of polarity without deleteriously affecting the overall quality of the film or the metal adhesion.

As indicated above, the oxygen content of the hydroxyl-donating material is believed to play an important role in the barrier properties of the film, in that the dissociation and recombining of the hydroxyl-donating material into —OH groups on the surface of the film imparts high surface energy to the film surface. In order to ensure that sufficient oxygen is present in the hydroxyl-donating material, oxygen may be added to the hydroxyl-donating material prior to or during the plasma treatment. Such additional oxygen can improve the hydroxyl concentration during the plasma treatment, thus helping to maintain the desired concentration of hydroxy groups. While the mechanism of hydroxyl surface group generation is not well understood, it is proposed that free radicals are formed directly on the exposed surface of the polyethylene layer from the plasma, and that two mechanisms are operating for generation of the hydroxyl surface groups on the surface. First, it is proposed that the hydroxyl surface groups are generated by hydroxyl moieties which are produced by the plasma, which recombine with the free radical sites formed on the film surface. Second, the free radical sites on the surface can react, for example with added oxygen in the plasma and with free hydrogen atoms generated in the plasma, to produce the hydroxyl surface groups directly on the surface.

With the addition of oxygen, it is contemplated that some higher chain alcohols may be useful with the present invention, so long as sufficient oxygen is present in the hydroxyl-donating material to maintain a proper concentration of free radicals capable of forming an alcohol rich surface on the polyethylene layer.

Noble gases such as helium or argon can also be added to the plasma to provide high energy species that enhance the alcohol dissociation, radical formation and subsequent recombination on the film surface.

The intermediate film structure having the alcohol-plasma treated polyethylene surface layer thereon further includes a metal layer deposited on the treated polyethylene layer. Such deposited metal layers are known in the art, and can be deposited using any known method, for instance, vacuum deposition, electroplating, sputtering, etc. Preferably, the metal layer is one of vacuum deposited aluminum, copper, silver, chromium, gold, and mixtures thereof, with vacuum deposited aluminum being most preferred.

Optionally, a heat sealable polymer can be incorporated into the film. Such a heat sealable polymer can be any layer or coating which will permit the film to be heat sealed to itself or heat sealed to some other surface, as is known in the art. Preferably, the intermediate film structure includes a polypropylene base layer with a polyethylene layer on one side thereof and a heat sealable layer on the other side thereof. The preferred heat sealable polymer is for example, an ethylene-propylene (EP) copolymer or an ethylene-propylene-butene-1 (EPB) terpolymer. The ratio of ethylene to propylene to butene-1 is preferably from about 0–15% ethylene, 70–100% propylene and 0–15% butene-1, with an ethylene propylene copolymer containing from about 2–7% by weight ethylene and from about 93% to about 98% by weight polypropylene being particularly useful.

Alternatively, a printable surface layer can be employed, for example, the intermediate film structure can include a polypropylene base layer with a polyethylene layer on one side thereof and a printable surface layer on the other side thereof. The printable surface can be any polymer capable of receiving a printed image thereon, such as a polyolefin homopolymer, copolymer or terpolymer, polycarbonate, polyester, high density polyethylene, etc.

Additionally, a polymeric film may be laminated to the metal layer of the multi layer film. Such polymeric film can improve the gauge, stiffness and puncture resistance of the overall film, and can further enhance the barrier properties of the film. The polymeric film can be oriented, unoriented, transparent or opaque. Preferably, the polymeric film is polypropylene or polyethylene, most preferably oriented polypropylene (OPP).

Such an additional polymeric film can be laminated to the metal layer using any suitable adhesive. A particularly preferred adhesive is a hot melt low density polyethylene, applied in an amount of about 10 pounds per ream.

The multi layer films of the present invention generally have a total thickness of about 0.55 to about 2.0 mils. The high density polyethylene layer is preferably about 0.02 to about 0.08 mils.

The multi layer films of the present invention exhibit excellent barrier properties against water vapor transmission and oxygen transmission. For example, the water vapor transmission rate of the multi layer film of the present invention is less than 0.01 grams per 100 square inches-24 hours. The oxygen transmission rate is less than 1.0–2.0 cc/100 square inches-24 hours.

The present invention also relates to a method of producing a multi layer film having excellent barrier properties against the transmission of oxygen and water vapor. In the method, an intermediate film structure is provided incorporating a polypropylene base layer having a high density polyethylene layer adhered to at least one side thereof Preferably, the intermediate film structure is provided by co-extruding the high density polyethylene skin layer with a selected propylene homopolymer or copolymer base layer. The intermediate film structure can then be oriented in the machine direction and/or the transverse direction, and is most preferably biaxially oriented in both the machine and transverse directions.

The high density polyethylene layer of the intermediate film structure is then subjected to plasma treatment with a plasma of an hydroxyl-donating material, for example, methanol. Such plasma treatment can be accomplished by any manner known in the art. Preferably, such plasma treatment is carried out in a vacuum chamber using a continuous roll treatment method for continuously treating a film, for instance as described in U.S. Pat. No. 4,897,305, incorporated herein by reference.

The plasma treatment is carried out under negative pressure, preferably at a pressure of about 20 to about 3000 millitorr, most preferably about 30–300 millitorr. The temperature during the plasma treatment is preferably maintained at about 20° C. to about 60° C.

Within the vacuum chamber, the film in sheet form is exposed to the hydroxyl-donating material in gaseous form. Preferably, the hydroxyl-donating material in gaseous form is flowed into the plasma chamber at a flow rate of about 0.1–4 SCCM of gas per 1 square foot of film processed per minute.

A plasma is then established within the vacuum chamber using a suitable plasma generating electrode, for instance by a planar cathode. With the application of an electric field, the plasma energizes the molecules of the hydroxyl-donating material, causing them to dissociate and recombine on the surface of the polyethylene layer of the film in the form of —OH groups. Preferably, the plasma is carried out at a power density of about 2–4 watts per square foot of film processed per minute.

The plasma treatment is conducted for a period of about 5 to about 60 milliseconds. After the film is passed through the plasma zone, the intermediate film structure having —OH free radicals present on the polyethylene surface thereof is then ready for deposition of the metal layer. While maintaining the intermediate film structure within the vacuum chamber, the intermediate film structure is transferred to or transported to the metal layer deposition area. Such metal deposition can be carried out using any suitable method, for example thermal evaporation of aluminum followed by condensation of the aluminum on the film surface, which is preferably rotating on a chilled roll.

As discussed, the plasma treatment in the presence of the hydroxyl-donating material establishes a high density of hydroxyl free radicals and imparts a high density of hydroxyl groups on the surface of the film. A plasma treated material generally has excess free radicals which quickly oxidize in the presence of air. By providing the free radical producing step, i.e. exposure to the hydroxyl-donating material-plasma, and the metal layer deposition step within the same vacuum chamber, the intermediate film structure is not subjected to air, which could deleteriously effect the adherence of the metal layer and deleteriously effect the barrier properties of the film. Thus, it is preferable that the plasma treatment and the metallization are conducted sequentially in the same vacuum chamber.

While the invention has been thus described in terms of specific embodiments, those skilled in the art will recognize that various modifications and variations can be made without departing from the spirit and scope of this invention. Such modifications and variations are considered to be within the purview and scope of the appended claims.

What is claimed is:

1. A multi-layer film comprising:

a polypropylene base layer;

a high density polyethylene layer adhered to at least one side of said polypropylene base layer, said polyethylene layer having an exposed surface, said polyethylene layer being provided with a plasma coating of hydroxyl groups from plasma deposition of a hydroxyl donating material selected from the group consisting of methanol, ethanol, propanol, butanol and mixtures thereof on said exposed surface; and a metal layer deposited on said polyethylene layer.

2. The film of claim 1, wherein said polypropylene base layer and said polyethylene layer are co-extruded.

3. The film of claim 1, wherein said polypropylene base layer and said polyethylene layer are biaxially oriented.

4. The film of claim 1, wherein said metal layer is selected from the group consisting of aluminum, copper, silver, chromium, gold, and mixtures thereof.

5. The film of claim 1, further comprising a heat sealable polymer layer on one side of said polypropylene base layer.

6. The film of claim 1, further comprising a polymeric film laminated to said metal layer.

7. A method of forming a multi-layer film comprising:

providing a polypropylene base layer having a high density polyethylene layer adhered to at least one side thereof;

plasma treating an exposed surface of said polyethylene layer with a hydroxyl donating material selected from the group consisting of methanol, ethanol, propanol, butanol, and mixtures thereof; and depositing a metal layer onto the plasma treated polyethylene layer.

8. The method of claim 7, wherein said hydroxyl donating material is capable of dissociating into hydroxyl free radicals, and reassociating on said polyethylene layer.

9. A method as in claim 7, wherein said depositing step and said plasma treating step are conducted sequentially in a single vacuum chamber.

* * * * *